US012688793B2

(12) United States Patent
Schassler et al.

(10) Patent No.: US 12,688,793 B2
(45) Date of Patent: Jul. 21, 2026

(54) SYSTEM AND METHOD FOR INTEGRATING A SIMULATED REALITY TRAINING ENVIRONMENT AND AN AUGMENTED REALITY ENVIRONMENT

(71) Applicant: Honeywell International Inc., Charlotte, NC (US)

(72) Inventors: Justin Schassler, Glendale, AZ (US); Robert Pickell, Atlanta, GA (US); Robert E. De Mers, Nowthen, MN (US); Luke Robertson, Wickford (GB); Raj Poojara, Katy, TX (US); Christian Salazar, Houston, TX (US); Ramesh Babu Koniki, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 505 days.

(21) Appl. No.: 18/311,635

(22) Filed: May 3, 2023

(65) Prior Publication Data

US 2024/0371292 A1 Nov. 7, 2024

(51) Int. Cl.
*G09B 19/00* (2006.01)
*G06T 19/00* (2011.01)

(52) U.S. Cl.
CPC .......... *G09B 19/003* (2013.01); *G06T 19/006* (2013.01)

(58) Field of Classification Search
CPC .... G09B 19/003; G09B 19/0069; G09B 5/02; G02B 27/017; G06T 19/006
See application file for complete search history.

(56) References Cited

U.S. PATENT DOCUMENTS

| | | | | |
|---|---|---|---|---|
| 2018/0061269 A1* | 3/2018 | Dutta | ..................... | G09B 19/00 |
| 2018/0102061 A1* | 4/2018 | Beeson | ................. | B23K 10/00 |
| 2021/0019215 A1* | 1/2021 | Neeter | ............ | G06Q 10/06316 |
| 2022/0366643 A1* | 11/2022 | Denman | ............... | G06T 19/006 |
| 2023/0031572 A1* | 2/2023 | Bruso | .................... | G06V 20/40 |
| 2023/0351914 A1* | 11/2023 | Sasha | ...................... | G09B 5/02 |
| 2024/0078930 A1* | 3/2024 | Corathers | ............... | G09B 5/02 |

* cited by examiner

*Primary Examiner* — Omkar A Deodhar
(74) *Attorney, Agent, or Firm* — ALSTON & BIRD LLP

(57) ABSTRACT

A method is disclosed for integrating a simulated reality training environment and an augmented reality environment. The method comprises receiving simulated reality training feedback associated with performance of a simulated task in the simulated reality training environment; determining a source of error in the performance of the simulated task in the simulated reality training environment based on the simulated reality training feedback; determining a preventative action for preventing occurrence of the source of error during a real-world task to be performed in the augmented reality environment; generating virtual content based on the preventative action to assist a user in avoiding the source of error during the real-world task to be performed in the augmented reality environment; and causing the virtual content to be displayed to the user in the augmented reality environment during performance of the real-world task.

20 Claims, 10 Drawing Sheets

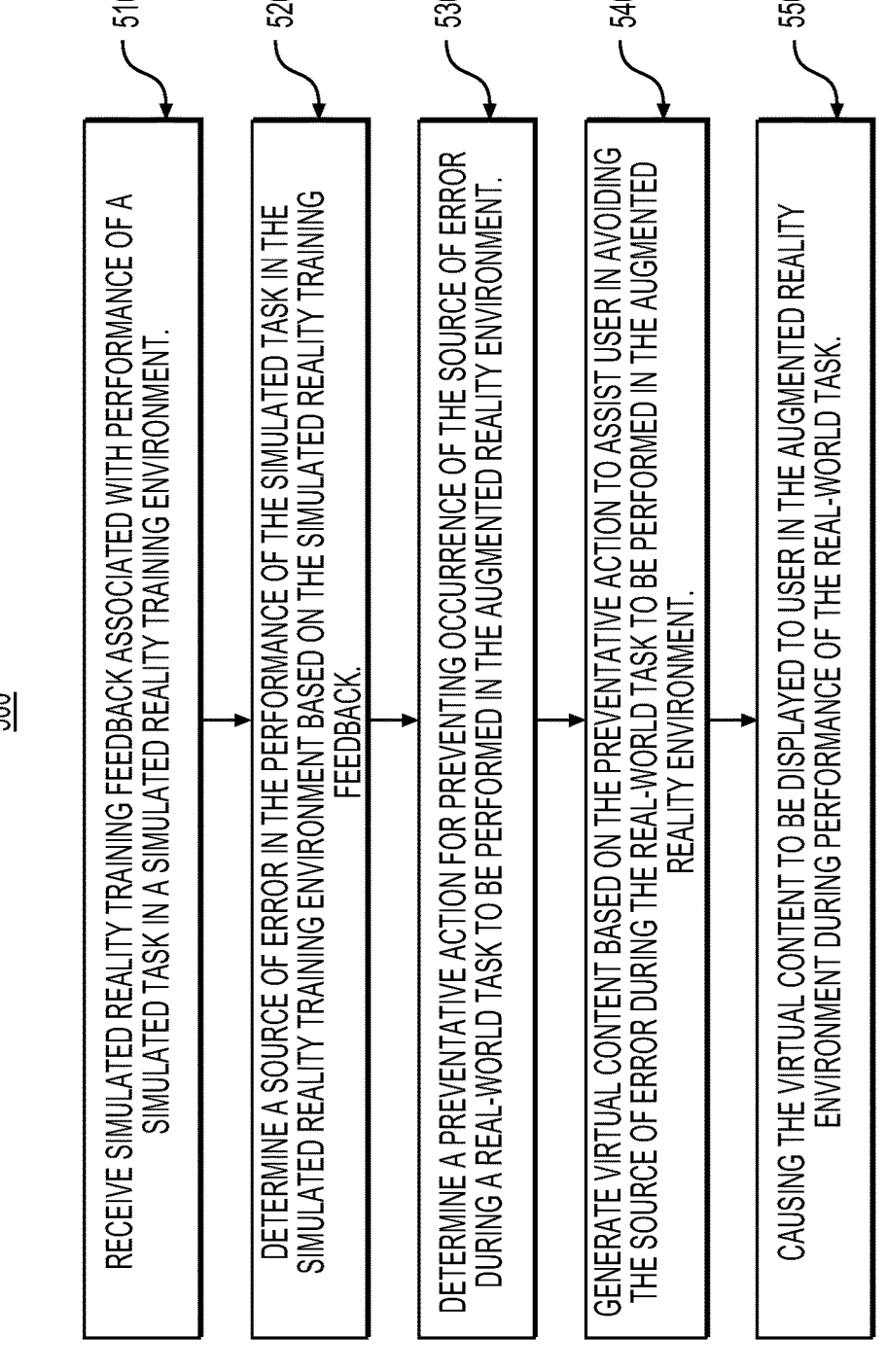

500

510 — RECEIVE SIMULATED REALITY TRAINING FEEDBACK ASSOCIATED WITH PERFORMANCE OF A SIMULATED TASK IN A SIMULATED REALITY TRAINING ENVIRONMENT.

520 — DETERMINE A SOURCE OF ERROR IN THE PERFORMANCE OF THE SIMULATED TASK IN THE SIMULATED REALITY TRAINING ENVIRONMENT BASED ON THE SIMULATED REALITY TRAINING FEEDBACK.

530 — DETERMINE A PREVENTATIVE ACTION FOR PREVENTING OCCURRENCE OF THE SOURCE OF ERROR DURING A REAL-WORLD TASK TO BE PERFORMED IN THE AUGMENTED REALITY ENVIRONMENT.

540 — GENERATE VIRTUAL CONTENT BASED ON THE PREVENTATIVE ACTION TO ASSIST USER IN AVOIDING THE SOURCE OF ERROR DURING THE REAL-WORLD TASK TO BE PERFORMED IN THE AUGMENTED REALITY ENVIRONMENT.

550 — CAUSING THE VIRTUAL CONTENT TO BE DISPLAYED TO USER IN THE AUGMENTED REALITY ENVIRONMENT DURING PERFORMANCE OF THE REAL-WORLD TASK.

| SOURCE OF ERROR | PREVENTATIVE ACTION | VIRTUAL CONTENT |
|---|---|---|
| USER OMITTED A STEP DURING PERFORMANCE OF THE SIMULATED TASK. | ADVISE USER TO ENSURE THAT THE OMITTED STEP IS PERFORMED. | VISUAL AND/OR AUDIO MESSAGE ADVISING USER TO PERFORM STEP AT CORRECT TIME. |
| | ADVISE USER TO SLOW DOWN. | VISUAL AND/OR AUDIO TIMER. |
| USER PERFORMED A STEP OF THE SIMULATED TASK IN AN INCORRECT ORDER. | ADVISE USER OF PROPER TIME TO PERFORM THAT STEP. | VISUAL AND/OR AUDIO MESSAGE ADVISING USER TO PERFORM STEP AT CORRECT TIME. |
| USER PERFORMED A STEP OF THE SIMULATED TASK IMPROPERLY. | PROVIDE DETAILED GUIDANCE THROUGH PERFORMANCE OF THAT STEP. | VISUAL INSTRUCTIONS AND/OR AUDIO NARRATION OF THE PROPER PROCEDURE FOR THAT STEP. |
| | CONNECT USER TO REMOTE PERSON TO PROVIDE GUIDANCE. | AUDIO FEED TO THE REMOTE PERSON. |
| USER MANIPULATED AN INCORRECT COMPONENT OF THE VIRTUAL MODEL. | HIGHLIGHT THE CORRECT REAL-WORLD COMPONENT. | IMAGE TO BE OVERLAID ON THE COMPONENT. |
| USER WAS UNABLE TO IDENTIFY A NECESSARY COMPONENT OF THE VIRTUAL MODEL. | HIGHLIGHT THE NECESSARY REAL-WORLD COMPONENT. | IMAGE TO BE OVERLAID ON THE COMPONENT. |

| SOURCE OF ERROR | PREVENTATIVE ACTION | VIRTUAL CONTENT |
|---|---|---|
| USER INTRODUCES AN INCORRECT STEP THAT WAS NOT PART OF TASK. | ADVISE USER TO STOP AND/OR UNDO INCORRECT STEP. | VISUAL AND/OR AUDIO MESSAGE ADVISING USER TO STOP AND/OR UNDO INCORRECT STEP. |
| USER DID NOT COMPLETE ALL STEPS OF THE TASK. | ADVISE USER OF OMITTED STEP. | VISUAL AND/OR AUDIO MESSAGE ADVISING USER TO PERFORM OMITTED STEP. |
| USER INCORRECTLY MARKED A TASK AS COMPLETED. | ADVISE USER OF OUSTANDING TASK REQUIREMENTS. | VISUAL AND/OR AUDIO MESSAGE ADVISING USER OF OUTSTANDING TASK REQUIREMENTS. |
| USER FAILED TO COMPLETE A STEP IN A CORRECT TIME (EITHER TOO SLOW OR TOO FAST). | ADVISE USER OF ALLOTED TIME FOR STEP. | VISUAL AND/OR AUDIO TIMER. |
| USER CHOSE INCORRECT TASK TO COMPLETE OUT OF A LIST OF AVAILABLE TASKS. | ADVISE USER OF CORRECT TASK. | VISUAL AND/OR AUDIO MESSAGE ADVISING USER TO PERFORM CORRECT TASK. |
| USER ABOUT TO PERFORM A HIGH RISK STEP OF A TASK. | REQUIRE AUTHORIZATION TO PROCEED. | VISUAL AND/OR AUDIO INTERFACE FOR REQUESTING AND RECEIVING APPROVAL. |

*FIG. 6*
*(CONT.)*

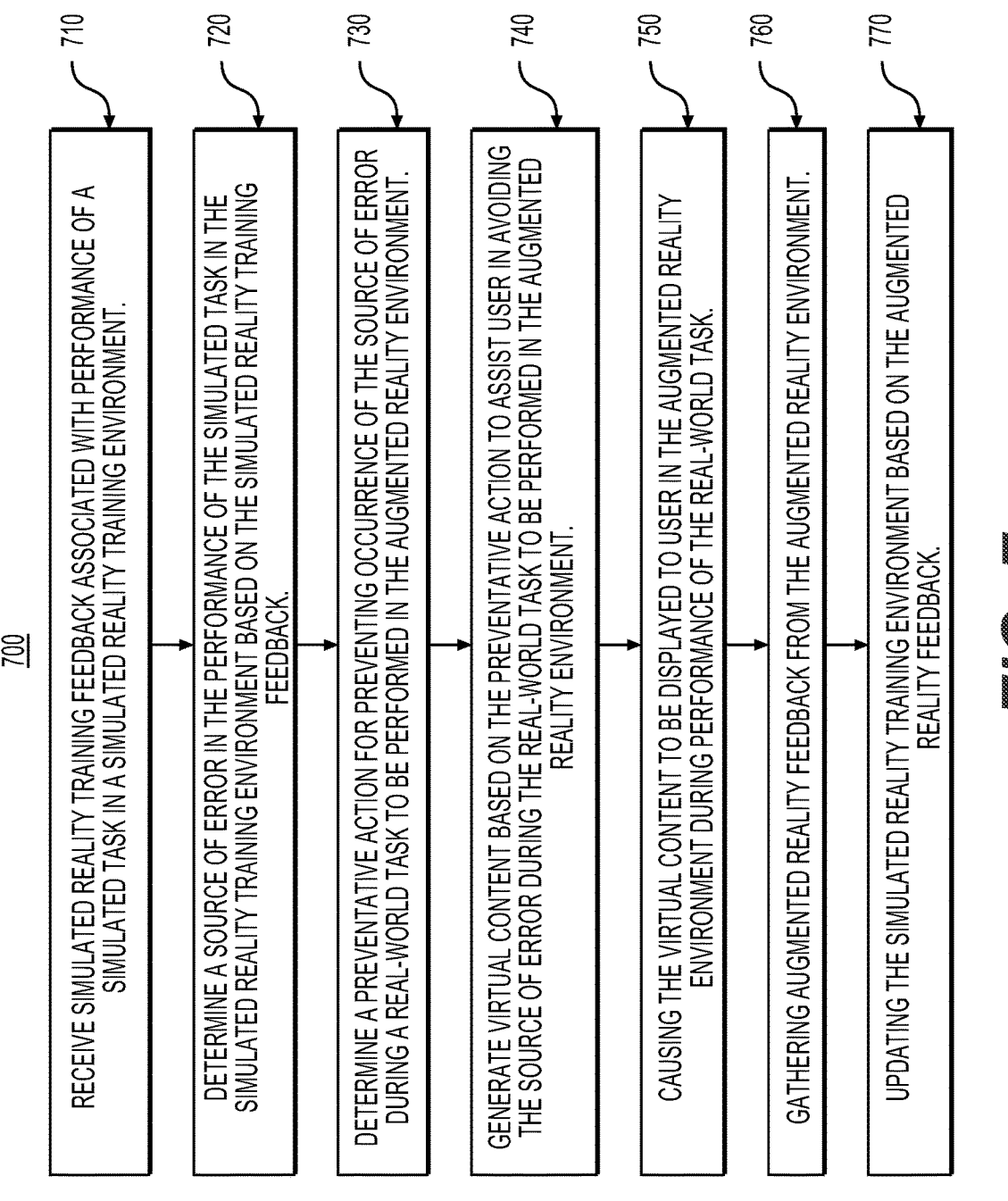

700

710 RECEIVE SIMULATED REALITY TRAINING FEEDBACK ASSOCIATED WITH PERFORMANCE OF A SIMULATED TASK IN A SIMULATED REALITY TRAINING ENVIRONMENT.

720 DETERMINE A SOURCE OF ERROR IN THE PERFORMANCE OF THE SIMULATED TASK IN THE SIMULATED REALITY TRAINING ENVIRONMENT BASED ON THE SIMULATED REALITY TRAINING FEEDBACK.

730 DETERMINE A PREVENTATIVE ACTION FOR PREVENTING OCCURRENCE OF THE SOURCE OF ERROR DURING A REAL-WORLD TASK TO BE PERFORMED IN THE AUGMENTED REALITY ENVIRONMENT.

740 GENERATE VIRTUAL CONTENT BASED ON THE PREVENTATIVE ACTION TO ASSIST USER IN AVOIDING THE SOURCE OF ERROR DURING THE REAL-WORLD TASK TO BE PERFORMED IN THE AUGMENTED REALITY ENVIRONMENT.

750 CAUSING THE VIRTUAL CONTENT TO BE DISPLAYED TO USER IN THE AUGMENTED REALITY ENVIRONMENT DURING PERFORMANCE OF THE REAL-WORLD TASK.

760 GATHERING AUGMENTED REALITY FEEDBACK FROM THE AUGMENTED REALITY ENVIRONMENT.

770 UPDATING THE SIMULATED REALITY TRAINING ENVIRONMENT BASED ON THE AUGMENTED REALITY FEEDBACK.

*FIG. 7*

SYSTEM AND METHOD FOR INTEGRATING A SIMULATED REALITY TRAINING ENVIRONMENT AND AN AUGMENTED REALITY ENVIRONMENT

TECHNICAL FIELD

Various embodiments of the present disclosure relate generally to methods and systems to connect simulated reality systems and, more particularly, to integration and sharing of information between a simulated reality training environment and an augmented reality environment.

BACKGROUND

Virtual reality systems and augmented reality systems are important tools in many fields. Virtual reality systems allow users to perform tasks in a virtual environment, where the user can learn and practice complex tasks without the need to have actual equipment present, and without the risk of damaging such equipment. For example, virtual reality systems may be used to train aircraft maintenance workers on various tasks for servicing a wide variety of aircraft. A disadvantage of virtual reality systems that limits wider use of such systems is the expense associated with creating and managing the content of the virtual environment.

Augmented reality systems differ from virtual reality systems in that the user actually performs a task in the real world, but the performance can be supplemented in various ways. However, users may become reliant on augmented reality systems to the extent that users fail to internalize lessons learned while completing tasks in the augmented reality environment, and/or fail to develop real-world problem solving skills. Thus, augmented reality systems, while ostensibly expanding the capabilities of a user, may ultimately be a hindrance to the development of the user. Overreliance on augmented reality systems is particularly problematic in the event of a power outage or other scenario in which the user loses communication with the augmented reality system.

The present disclosure is directed to overcoming one or more of these above-referenced challenges.

SUMMARY OF THE DISCLOSURE

Some aspects of the present disclosure are directed to a method for integrating a simulated reality training environment and an augmented reality environment, the method comprising: receiving, by at least one processor, simulated reality training feedback associated with performance of a simulated task in the simulated reality training environment; determining, by at least one processor, a source of error in the performance of the simulated task in the simulated reality training environment based on the simulated reality training feedback; determining, by at least one processor, a preventative action for preventing occurrence of the source of error during a real-world task to be performed in the augmented reality environment; generating, by at least one processor, virtual content based on the preventative action to assist a user in avoiding the source of error during the real-world task to be performed in the augmented reality environment; and causing, by at least one processor, the virtual content to be displayed to the user in the augmented reality environment during performance of the real-world task.

In some aspects, the simulated reality training feedback comprises at least one of: a time spent performing individual portions of the simulated task; a time spent performing the simulated task in its entirety; and one or more errors made while performing the simulated task.

In some aspects, the virtual content comprises at least one of: a message; a timer; instructions for performing a step; an audio feed to a remote person; and an image to be overlaid on a real-world component.

In some aspects, the method further comprises: gathering, by at least one processor, augmented reality feedback from the augmented reality environment; and updating, by at least one processor, the simulated reality training environment based on the augmented reality feedback.

In some aspects, the augmented reality feedback comprises at least one of: a time spent performing individual portions of the real-world task; a time spent performing the real-world task in its entirety; and one or more errors made while performing the real-world task.

In some aspects, the augmented reality environment is generated by one or more wearable or handheld devices.

In some aspects, the simulated reality training environment is a virtual reality environment.

Other aspects of the present disclosure are directed to a computer system for integrating a simulated reality training environment and an augmented reality environment, the computer system comprising: a memory having processor-readable instructions stored therein; and one or more processors configured to access the memory and execute the processor-readable instructions, which when executed by the one or more processors configures the one or more processors to perform a plurality of functions, including functions for: receiving, by at least one processor, simulated reality training feedback associated with performance of a simulated task in the simulated reality training environment; determining, by at least one processor, a source of error in the performance of the simulated task in the simulated reality training environment based on the simulated reality training feedback; determining, by at least one processor, a preventative action for preventing occurrence of the source of error during a real-world task to be performed in the augmented reality environment; generating, by at least one processor, virtual content based on the preventative action to assist a user in avoiding the source of error during the real-world task to be performed in the augmented reality environment; and causing, by at least one processor, the virtual content to be displayed to the user in the augmented reality environment during performance of the real-world task.

In some aspects, the simulated reality training feedback comprises at least one of: a time spent performing individual portions of the simulated task; a time spent performing the simulated task in its entirety; and one or more errors made while performing the simulated task.

In some aspects, the virtual content comprises at least one of: a message; a timer; instructions for performing a step; an audio feed to a remote person; and an image to be overlaid on a real-world component.

In some aspects, the plurality of functions further includes functions for: gathering, by at least one processor, augmented reality feedback from the augmented reality environment; and updating, by at least one processor, the simulated reality training environment based on the augmented reality feedback.

In some aspects, the augmented reality feedback comprises at least one of: a time spent performing individual portions of the real-world task; a time spent performing the real-world task in its entirety; and one or more errors made while performing the real-world task.

In some aspects, the augmented reality environment is generated by one or more wearable or handheld devices.

In some aspects, the simulated reality training environment is a virtual reality environment.

Other aspects of the present disclosure are directed to a non-transitory computer-readable medium containing instructions for integrating a simulated reality training environment and an augmented reality environment, the instructions comprising: receiving, by at least one processor, simulated reality training feedback associated with performance of a simulated task in the simulated reality training environment; determining, by at least one processor, a source of error in the performance of the simulated task in the simulated reality training environment based on the simulated reality training feedback; determining, by at least one processor, a preventative action for preventing occurrence of the source of error during a real-world task to be performed in the augmented reality environment; generating, by at least one processor, virtual content based on the preventative action to assist a user in avoiding the source of error during the real-world task to be performed in the augmented reality environment; and causing, by at least one processor, the virtual content to be displayed to the user in the augmented reality environment during performance of the real-world task.

In some aspects, the simulated reality training feedback comprises at least one of: a time spent performing individual portions of the simulated task; a time spent performing the simulated task in its entirety; and one or more errors made while performing the simulated task.

In some aspects, the virtual content comprises at least one of a message; a timer; instructions for performing a step; an audio feed to a remote person; and an image to be overlaid on a real-world component.

In some aspects, the instructions further comprise: gathering, by at least one processor, augmented reality feedback from the augmented reality environment; and updating, by at least one processor, the simulated reality training environment based on the augmented reality feedback.

In some aspects, the augmented reality feedback comprises at least one of: a time spent performing individual portions of the real-world task; a time spent performing the real-world task in its entirety; and one or more errors made while performing the real-world task.

In some aspects, the augmented reality environment is generated by one or more wearable or handheld devices.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 is a flow diagram of a method for integrating a simulated reality training environment and an augmented reality environment, according to one or more embodiments.

FIG. 6 is a table showing correspondence between source of error, preventative action, and virtual content, according to one or more embodiments.

FIG. 7 is a flow diagram of a method for integrating a simulated reality training environment and an augmented reality environment, according to one or more embodiments.

DETAILED DESCRIPTION OF EMBODIMENTS

Figure 1:
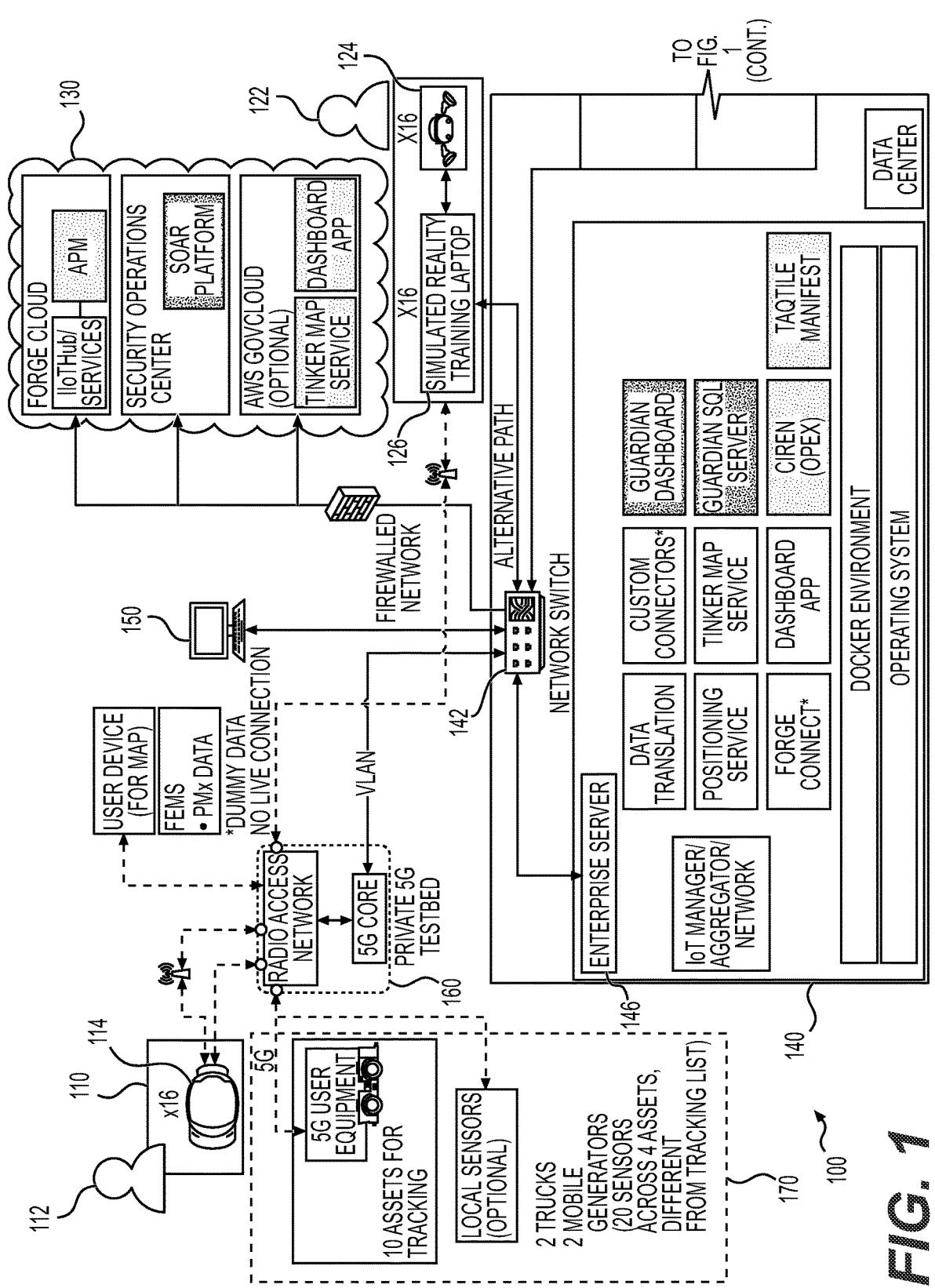
FIG. 1 is a schematic diagram of a system for integrating a simulated reality training environment and an augmented reality environment, according to one or more embodiments.
Figure 1:
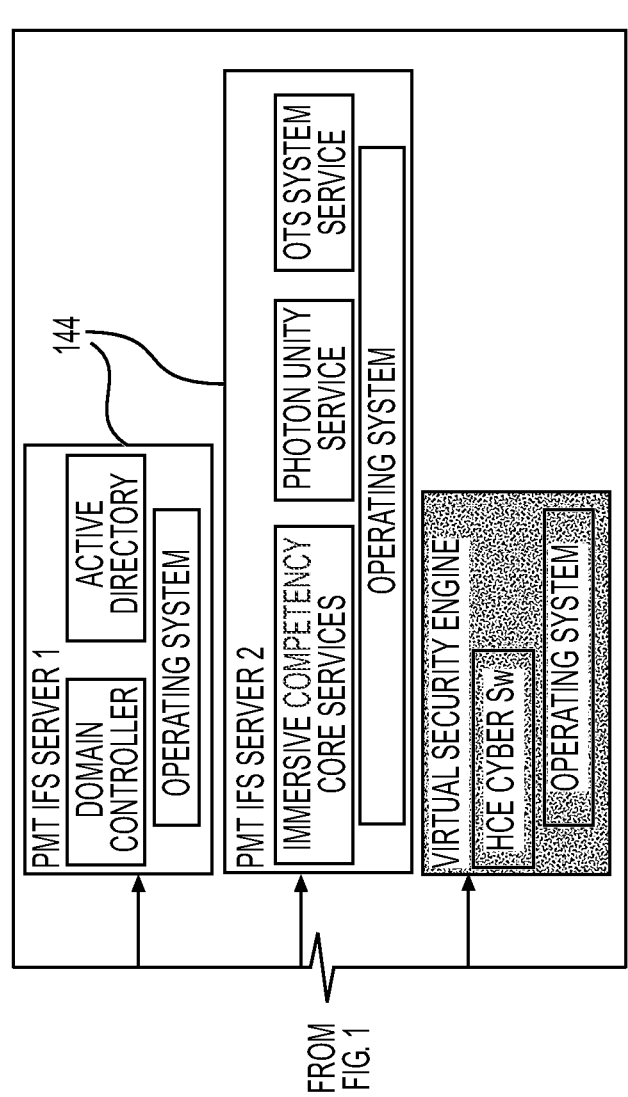
Figure 1:

Various embodiments of the present disclosure relate generally to methods and systems to connect simulated reality systems and, more particularly, to integration and sharing of information between a simulated reality training environment and an augmented reality environment.

Embodiments and/or implementations of systems and methods techniques described herein may facilitate communications within one or more work sites, between users (e.g., on-site worker, remote worker, etc.), and between work sites, third parties associated therewith, and data centers. Such communications may be facilitated by edge systems and gateway systems. The edge and gateway systems may be located in work sites (i.e., on-site) as embedded or fixed systems and/or other user devices such as tablet PCs and mobile phones (e.g., devices controlled by or in communication with an operations manager, etc.). Each edge system may be coupled to a work site system from which work site operations data may be collected, and in communication with other edge systems and gateway systems. Each gateway system may be in communication with work site operation systems and edge systems of the work site in which the gateway system is resident (e.g., with the operations manager), and may also be in communication with gateway systems located in other work sites, all or some of which may provide data to the gateway system. By facilitating communication with gateway systems located in other work sites, the gateway system may enable exchange of data among edge systems installed in different work sites. Independent user computing devices, such as tablet PCs and mobile phones, may be directly coupled to and/or in communication with the edge systems and/or gateway systems, to request, filter, view, and/or analyze data.

Hardware for all or some of the edge systems and gateway systems may be installed in work sites. Therefore, software may be installed on the corresponding work site hardware. The software implemented in the edge systems and gateway systems may comprise computer-executable code for performing various data functions, including but not limited to, data request, data query, data retrieval, data transmission, and data analytics. The edge systems and gateway systems each identify source(s) of relevant data, and request that data be provided dynamically (as needed) or statically (all the time) from the identified source(s), such as from other edge systems coupled to work site systems in the work site or other work sites, gateway systems in the work site or other work sites, decentralized system(s) such as cloud computing center(s), and centralized system(s) such as dedicated server farms. The decentralized system(s) and centralized system (s) may be owned by the operators of the work sites, or by a third party such as a government or a commercial entity.

Each edge system in a work site may be coupled to a sensor of a corresponding work site system in the same work site, enabling data captured by the sensor to be provided directly to the edge system. Also, a gateway system in a work site may be coupled to one or more sensors of work site systems in the same work site, enabling data captured by the one or more sensors to be provided directly to the gateway system. In another embodiment, each edge system in a work site may be coupled to work site system of a corresponding work site system in the same work site. Also, a gateway system in a work site may be coupled to work site system machines of work site systems in the same work site. In some aspects, work site system machines may be configured to collect data from the coupled one or more sensors, perform computations and/or analysis of the collected data, store the collected and/or analyzed data in memory, and provide the collected and/or analyzed data to one or more connected edge systems and/or gateway system. In some embodiments, the work site system may not be implemented, or may not be coupled to the one or more sensors of the work site system. If the work site system machine is not implemented or not coupled to the one or more sensors, data captured by the one or more sensors may be provided directly to the one or more connected edge systems and/or gateway system.

Each work site system may be in communication with, through an edge system or not, a gateway system. Edge systems in a work site may be in direct communication with one another. For example, any data retained by one edge system may be transmitted directly to another edge system within the same work site, without a gateway system acting as an intermediary. In another embodiment, an edge system may send to or receive data from another edge system located in the same work site through a gateway system. The communication between the edge systems and the communication between the edge systems and the gateway system may be through a wired or wireless connection.

A gateway system of a work site may be in communication with gateway systems of other work sites. Through this communication path, an edge system or a gateway system of a work site may transmit data to and obtain data from edge systems or gateway systems of other work sites. The communication path between gateway systems of different work sites may be through satellite communications (e.g., SATCOM), cellular networks (e.g. 5G), Wi-Fi (e.g., IEEE 802.11 compliant), WiMAX (e.g., AeroMACS), optical fiber, and/or air-to-ground (ATG) network, and/or any other communication links now known or later developed. An edge system in a work site may communicate with another edge system in a different work site via gateway systems of the respective work sites. For example, an edge system in a work site may transmit data to one or more edge systems in other work sites via the gateway systems of the respective work sites communicating over the communication path discussed above.

Each edge system and gateway system may comprise state machines, such as processor(s) coupled to memory. Both the edge systems and the gateway systems may be configured with a common operating system to support portable, system-wide edge software implementations. In other words, each of the edge systems and the gateway systems may be equipped with standard software to facilitate inter-operability among the edge systems and the gateway systems. In the discussion below, such software will be referred to as edge software. The edge software may enable each edge system or gateway system to perform various functions listed below (non-exhaustive) to enable data analysis and data exchange among the various systems illustrated herein (e.g., edge systems, gateway systems, work site operations centers, remote systems):

Filter and analyze real-time and stored data collected from other edge systems, work site systems, gateway systems, and/or operations center(s), and generate events based on the analysis; Identify dynamic (i.e., as needed) and static (i.e., all the time) data transmission targets (e.g., edge systems within the same work site, edge systems in other work sites, operations center(s)); Transmit data over an Internet connection to the operations centers; Provide a request/response interface for other edge/gateway systems, work site borne computer systems, operations centers, and remote systems connected over wired/wireless networks or Internet to query the stored data and to dynamically select/change data filters; Use request/response interfaces provided by other edge systems, gateway systems, and operations centers connected over wired/wireless networks or Internet to obtain data and to dynamically select/change data filters; Receive events from other edge systems, gateway systems, and operations centers; and Specify and communicate generic purposes (i.e., types of data the edge/gateway system is interested in) to other edge systems, gateway systems, and operations centers.

Each edge system or gateway system may autonomously select and deliver data to one or more transmission targets, which may be other edge systems in the same work site, edge systems in other work sites, gateway system in the same work site, gateway systems in other work sites, or operations center(s). Each of the receiving edge or gateway systems (i.e., transmission targets) may be configured to filter the received data using a pre-defined filter, overriding the autonomous determination made by the edge system transmitting the data. In some embodiment, each receiving edge or gateway system may notify the other systems, in advance of the data transmission, of the types of data and/or analysis the receiving system wants to receive (i.e., generic "purposes"). Also, each edge or gateway system may maintain a list including static data transmission targets (transmission targets that always need the data) and dynamic data transmission targets (transmission targets that need the data on as-needed basis).

A gateway system of a work site may also be in communication with one or more operations centers, which may be located remotely from the work site (i.e., off-site). In some embodiments, however, the operations center(s) may be located on-site at the work site. Each of the work site systems of this disclosure may be implemented in a dedicated location, such as a server system, or may be implemented in a decentralized manner, for example, as part of a cloud system. The communication path between the gateway systems and the operations center(s) may be through satellite communications (e.g., SATCOM), cellular networks (e.g., 5G), Wi-Fi (e.g., IEEE 802.11 compliant), WiMAX (e.g., AeroMACS), optical fiber, and/or air-to-ground (ATG) network, and/or any other communication links now known or later developed.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As used herein, the term "simulated reality training environment" refers to a computer-generated environment in which a user practices and/or is trained for performance of a task. For example, a user may be trained to perform maintenance on a piece of equipment using a computer-generated simulation of the piece of equipment. The simulated reality training environment may include computer-generated content, such as visual or audio guidance, to assist the user in completing the task within the simulated reality training environment. In some examples, the user is allowed to commit errors or fail within the simulated reality training environment so that the user must perform corrective actions to rectify those errors. In some examples, the simulated reality training environment presents the user with obstacles to completion of the task in order to force the user to problem solve. In some examples, the simulated reality training environment may increase the difficulty of the task relative to what the user is likely to experience in the real world, so that subsequent real-world performance of the task feels relatively easier to the user. In some examples, the simulated reality training environment is a virtual reality environment.

As used herein, the terms "simulated reality training system" and "simulated reality training subsystem" mean the infrastructure of hardware, software, and/or firmware components that produces the simulated reality training environment.

As used herein, the term "virtual reality environment" means a computer-generated simulation in which a user's view of the real world in completely blocked, such that the only visual interaction the user experiences is computer-generated content. A visual component of the computer-generated content may be produced, for example, by a headset that blocks the user's vision of the real world and displays a virtual image to the user. The virtual image may include elements that simulate real-world objects (e.g. buildings, roadways, machines, equipment, vehicles, and/or people) and/or elements that do not correspond to real-world objects (e.g. a dashboard located at the periphery of the user's view). The virtual reality environment may incorporate pose tracking so that the virtual image updates to reflect movement of the user. The user may interact with the virtual image using various devices such as handheld devices, i.e. haptic devices. In addition to visual content (i.e. the virtual image), the virtual reality environment may include audible and/or other sensory content for the user to experience. In examples of the present disclosure, a virtual reality environment may be used as a simulated reality training environment.

As used herein, the terms "virtual reality system" and "virtual reality subsystem" mean the infrastructure of hardware, software, and/or firmware components that produces a virtual reality environment.

As used herein, the term "augmented reality environment" means a computer-generated simulation that supplements the real-world environment of a user with computer-generated content. An augmented reality environment may include, for example, a computer-generated virtual image that is overlaid onto real-world objects to emphasize such objects to the user. The virtual image may additionally (or alternatively) include computer-generated images not directly associated with real-world objects, such as a map, clock, timer, instructions, checklist, and/or dashboard. The virtual image may be displayed, for example, by a headset or other device worn by the user. In addition to the virtual image, the augmented reality environment may include computer-generated virtual audio content (such as guidance and/or narration) and/or other sensory content (such as haptic feedback). The augmented reality environment may further include audio connection to a remote person, such as an instructor, to provide real-time audio guidance to the user.

As used herein, the terms "augmented reality system" and "augmented reality subsystem" mean the infrastructure of hardware, software, and/or firmware components that produces an augmented reality environment.

Referring now to the accompanying drawings, FIG. 1 depicts an exemplary system 100 for integrating a simulated reality training environment and an augmented reality environment, according to one or more embodiments of the present disclosure. As shown in FIG. 1, system 100 includes augmented reality subsystem 110 which assists and supplements user 112 during performance of a real-work task, such as maintenance and/or repair of a machine, vehicle, aircraft, etc. Augmented reality subsystem 110 generates an augmented reality environment that includes simulated, virtual content (i.e., visual, audible, and/or other sensory content) to improve efficiency of user 112, prevent user 112 from making errors, and/or provide corrective assistance to user 112 should an error occur. Augmented reality subsystem 110 may include one or more wearable or handheld devices 114. In some embodiments, wearable or handheld device(s) 114 may include a headset that displays the simulated content to user 112 while user 112 interacts with the real world. In some embodiments, wearable or handheld device(s) 114 may include a tablet, smartphone, or other camera-equipped device that a user may aim at a real-world object, and augmented reality data is overlaid onto the display of the camera feed.

With continued reference to FIG. 1, system 100 further includes simulated reality training subsystem 120 that user 122 interfaces with during performance of a simulated reality task. More particularly, simulated reality training subsystem 120 generates a simulated reality training environment in which user 122 is trained for performance of a real-world task that user 122 will later perform in the augmented reality environment. The simulated reality training environment includes simulated, virtual content (i.e., visual, audible, and/or other sensory content) to allow user 122 to perform a task remote from the real-world environment in which the real-world task will later be performed. Simulated reality subsystem 120 may include one or more devices 124 through which simulated reality subsystem 120 displays virtual content to user 122, and through which user 122 interacts with the virtual content of the simulated reality training environment. In some embodiments, one or more devices 124 may include a headset with a screen displaying virtual content, a stationary (e.g., desk-mounted) display that provides a wraparound immersive view of virtual content, and/or a stationary display that projects virtual content onto a surface (e.g., a wall of a room). One or more devices 124 may further include handheld devices, such as joysticks, controller, or the like to provide haptic feedback and allow users to input commands. Simulated reality subsystem 120 may further include a computer 126 (e.g. PC or laptop) connected to the one or more devices 124. In some embodiments, simulated reality training subsystem 120 is a virtual reality subsystem, and the simulated reality training environment is a virtual reality environment.

In some embodiments or instances of use of system 100, user 112 of augmented reality system 110 may be the same entity (e.g. the same person) as user 122 of simulated reality training subsystem 120. For example, user 122 may first be trained to perform a task in the simulated reality training environment of simulated reality training subsystem 120, and then user 112 (the same entity as user 122) may perform the task in the real world with the assistance of the augmented reality environment of augmented reality subsystem 110. In other embodiments, or instances of use of system 100, user 112 and user 122 may be different entities. Information learned about the task by observing many users within simulated reality training subsystem 120 may be used to improve simulated reality training subsystem 120, as will be described in detail herein. For example, as will be discussed herein, if many users omit or incorrectly perform a step in the task in the simulated reality training environment, augmented reality subsystem 110 may be trained to remind users to perform that step before moving on within a corresponding task performed in the real world.

With continued reference to FIG. 1, augmented reality subsystem 110 and simulated reality training subsystem 120 may communicate with an edge system (as described herein), cloud 130, data center 140, master device 150, and various other external components. Cloud 130 (e.g., a cloud computing network, one or more remote servers) may be any local or networked system suitable for transferring data. Augmented reality subsystem 110 may periodically or continuously transmit data, e.g., data relating to performance of user 112 in the augmented reality environment, to cloud 130. For example, augmented reality subsystem 110 may transmit data relating to users' requests for assistance during performance of task, so that simulated reality training environment can be updated to provide more emphasis on portions of the task where users most commonly need assistance. Augmented reality subsystem 110 may also periodically or continuously receive data from cloud 130 and/or data center 140. Similarly, simulated reality training subsystem 120 may periodically or continuously transmit data, e.g. data relating to performance of user 122 in the simulated reality training environment, to cloud 130 and/or data center 140. In some embodiments, augmented reality subsystem 110 may communicate with cloud 130 and/or data center 140 via radio access network (RAN) 160, which may be a cellular network such as a 5G network. Simulated reality training subsystem 120 may also periodically or continuously receive and transmit data from/to cloud 130 and/or data center 140.

With continued reference to FIG. 1, data center 140 may be in communication with augmented reality subsystem 110, simulated reality training subsystem 120, cloud 130, master device 150, and/or RAN 160 via network switch 142 using any of the various network connections described herein. Data center 140 may include various servers, engines, and the like, such as one or more immersive field simulator (IFS) servers 144 and one or more connected enterprise servers 146. IFS servers 144 and/or connected enterprise servers 146 may be configured to process data and information from augmented reality subsystem 110 and simulated reality training subsystem 120. In particular, various components of data center 140 may include at least one processor configured to receive simulated reality training feedback associated with performance of one or more tasks by user 122 in the simulated reality training environment generated by simulated reality training subsystem 120. Simulated reality training feedback may include data unique to user 122, and/or data representative of a plurality of users (of which user 122 may be one). Simulated reality training feedback may include, for example: occurrences of errors made by user 122 during performance of one or more tasks in the simulated reality training environment; completion times of one or more tasks performed by user 122 in the simulated reality training environment; assessment of the competency of user 122 with respect to one or more tasks performed by user 122 in the simulated reality training environment; and the like. Simulated reality training feedback may further include averages of data relating to performance of user 122 across multiple training sessions in the simulated reality training environment, such as error rate during performance of one or more tasks, average completion time of one or more tasks, and the like. Simulated reality training feedback may further include aggregated data for a plurality of users, of which user 122 may be one. Such aggregated data may include, for example: error type data (i.e. particular types of errors made by users); error rates of users during performance of one or more tasks in the simulated reality training environment; statistical data (e.g., mean, median, and mode) of completion times of one or more tasks performed by users in the simulated reality training environment; and the like.

Similarly, various components of data center 140 may include at least one processor configured to receive augmented reality feedback associated with performance of one or more tasks by user 112 in the augmented reality environment generated by augmented reality subsystem 110. Augmented reality feedback may include data unique to user 112, and/or data representative of a plurality of users (of which user 112 may be one). Augmented reality feedback may include, for example, occurrences of errors made by user 112 and/or observation of behaviors made by user 112 during performance of one or more tasks in the augmented reality environment. Particular behaviors of interest may include for example, requests for additional help, going back a step during performance of a task, starting over a step of a task, using additional parts, and other behaviors indicating that user 112 is not entirely comfortable or proficient at performing a task. Observation of such behaviors may be used as a proxy for error detection (or preemptively preventing errors) particularly where the system is not able to directly detect user errors in the real world.

Augmented reality feedback may further include object recognition carried out by artificial intelligence and/or machine learning models, and tracking of user motion and or manipulation of objects in the real-world environment by artificial intelligence and/or machine learning models. Augmented reality feedback may further include completion times of one or more tasks performed by user 112 in the augmented reality environment; assessment of the competency of user 112 with respect to one or more tasks performed by user 112 in the augmented reality environment; and the like.

Augmented reality feedback may further include averages of data relating to performance of user 112 across tasks in the augmented reality environment, such as error rate during performance of one or more tasks, average completion time of one or more tasks, and the like. Augmented reality feedback may further include aggregated data for a plurality of users, of which user 112 may be one. Such aggregated data may include, for example: error rates of users during performance of one or more tasks in the augmented reality environment; statistical data (e.g., mean, median, and mode) of completion times of one or more tasks performed by users in the augmented reality environment; and the like Augmented reality feedback may further include manual input from user 112 (or a plurality of users) of augmented reality subsystem 110. For example, user 112 may be prompted during and/or upon completion of a task in augmented reality environment to provide suggestions for improving the correlation between simulated reality training environment and the real world. For example, user 112 may flag instances where the task in the real world did not match the task in simulated reality training environment; where replacement parts were not built properly (e.g., bolt holes do not align, etc.); where local weather conditions required deviation from the task as performed in simulated reality training environment (e.g., cold weather requires thicker gloves, but thicker gloves interfere with the tools specified in simulated reality training environment; an air compressor was inoperable due to freezing conditions; a metal part exposed to sun became too hot to handle without protective gloves; etc.)

With continued reference to FIG. 1, data center 140 may be further configured to determine a source of error during performance of a task by user 122 in the simulated reality training environment generated by the simulated reality training subsystem 120. The source of error may include, for example, user 122 skipping a step in a sequence, or user 122 improperly (e.g., unsafely) performing a step in a sequence. Data center 140 may be further configured to identify or determine a preventative or remedial action to prevent further occurrence of the source of error in real world performance of the task. For example, if the source of error is user 122 skipping a step in a sequence, data center 140 may determine that an appropriate preventative action is to remind user 122 of the skipped step during real world performance of the task. Similarly, if the source of error is user 122 improperly performing a step in a sequence, data center 140 may determine that an appropriate preventative action is to provide additional guidance to user 122 during performance of the subject step during real world performance of the task.

With continued reference to FIG. 1, IFS servers 144 of data center 140 may be further configured to generate virtual content for use in the augmented reality environment generated by augmented reality subsystem 110 and in the simulated reality training environment generated by simulated reality training subsystem 120. Generally, virtual content generated for the augmented reality environment and simulated reality training environment may include images, audio, remote connection to other person(s), and other sensory content with which user 112, 122 can interact. Virtual content generated for the simulated reality training environment may further include virtual representation of real-world objects based on three dimension models (e.g. 3D CAD models), such as machinery on which a maintenance task is to be performed. Further details and examples of virtual content are described hereinafter.

With continued reference to FIG. 1, master device 150 may be, for example, a computer through which an entity having designated authority (e.g. a system administrator) can manage other components of system 100, manage user information, and perform other commensurate functions.

With continued reference to FIG. 1, system 100 may further include telemetry subsystem 170 for tracking assets (such as augmented reality subsystem 110 and simulated reality training subsystem 120), users 112, 122, and other components of system 100. Telemetry subsystem 170 may communicate with augmented reality subsystem 110, simulated reality training subsystem 120, cloud 130, data center 140, and or master device 150 via RAN 160 or via another suitable network.

Figure 2:
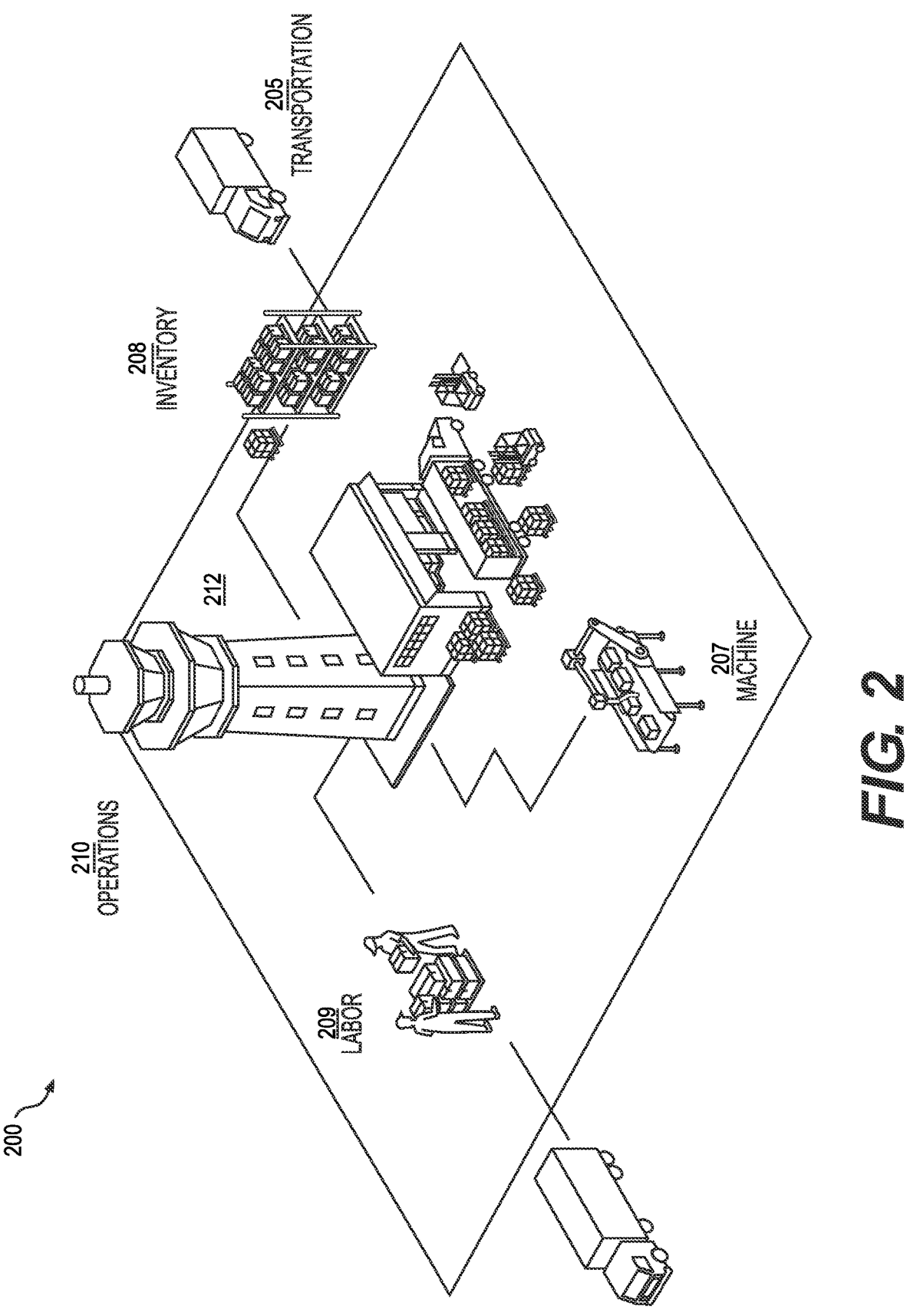
FIG. 2 is a schematic diagram of an environment worksite implementing methods and systems of the present disclosure, according to one or more embodiments.

FIG. 2 illustrates an environment 200 including an exemplary worksite and/or maintenance facility with certain components, including delivery transportation 205 (e.g., supply chain delivery truck) to load into inventory 208. An operational control tower 212 may monitor and/or otherwise control operations 210 within environment 200. Operations 210 can be performed and/or managed by labor 209 (e.g. service technicians, users 112, 122 of FIG. 1). Operations 210 can include assembly, service, and/or maintenance of machines 207 (e.g. aircraft). The environment 200 is configured to optimize performance of operations 210 through the use of augmented reality (via augmented reality subsystem 110 of FIG. 1), which improves efficiency and safety of labor 209, as discussed more particularly below.

Figure 3:
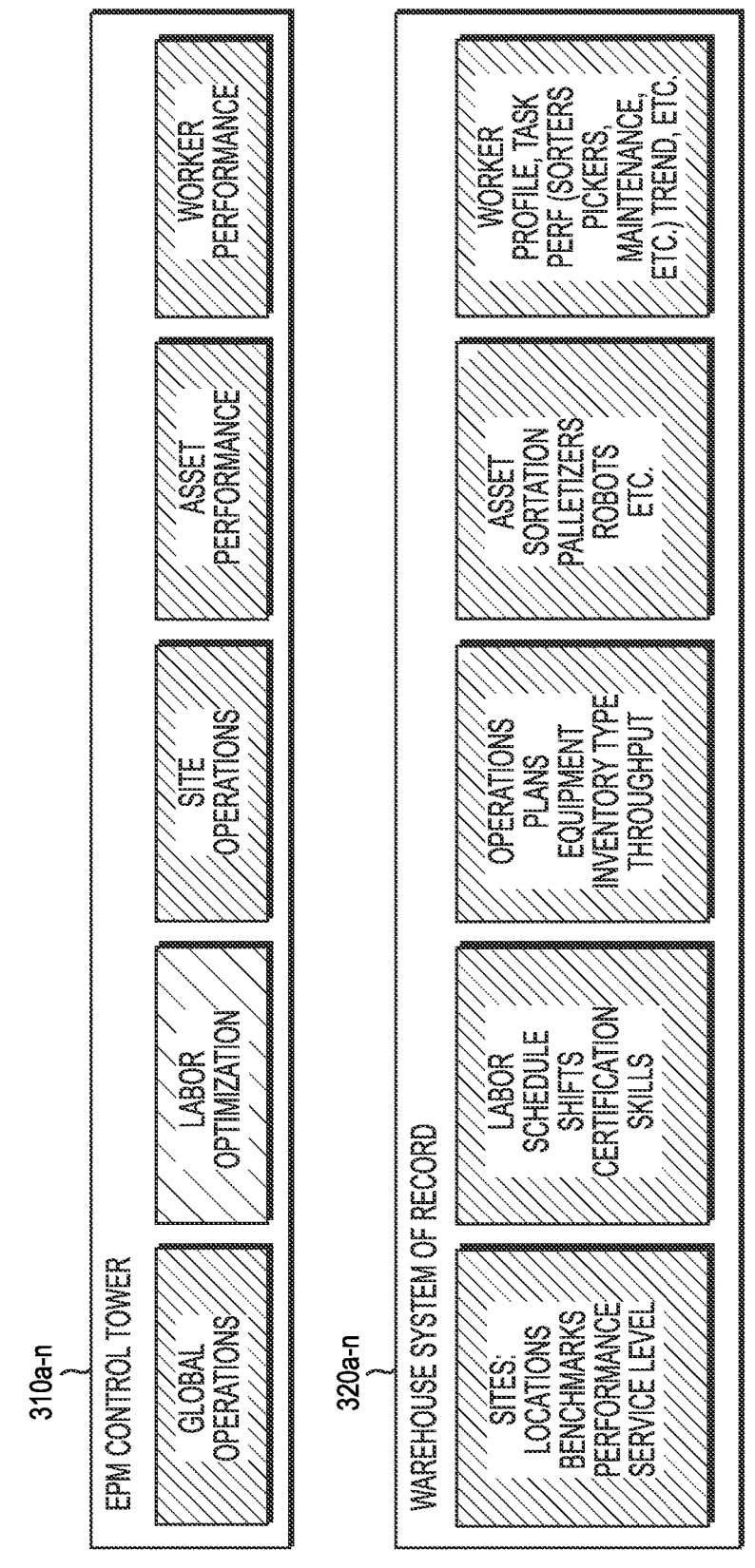
FIG. 3 is a diagram of architecture of a connected maintenance and/or service system of the present disclosure, according to one or more embodiments.
Figure 3:
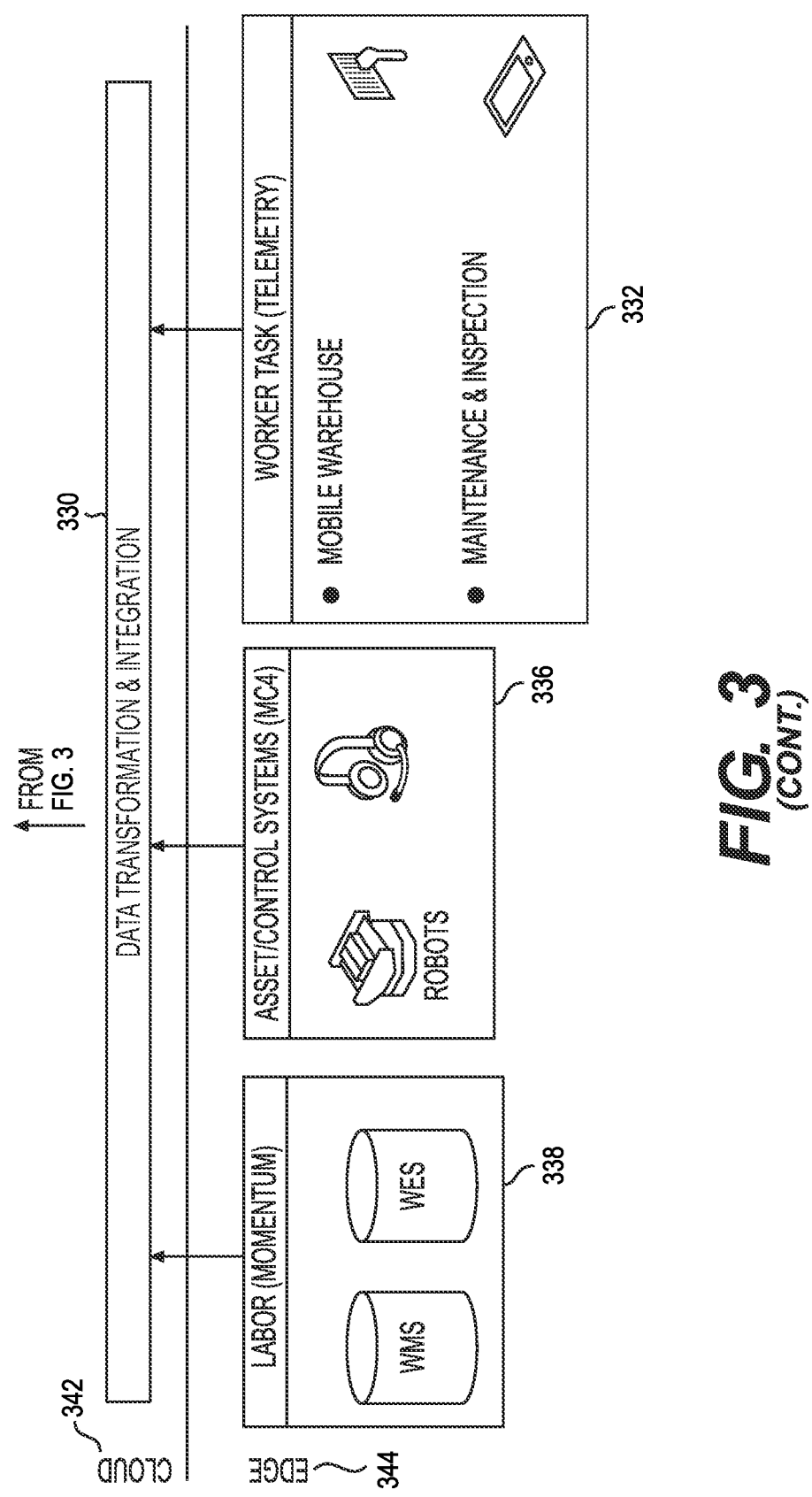

FIG. 3 is a diagram of architecture associated with of a connected maintenance and/or service system 300 of the present disclosure. System 300 can include enterprise performance management (EPM) control tower 310a-n, including components and databases such as but not limited to global operations, labor optimization, site operations, asset performance, and worker performance. System 300 can also include a networked system of record 320a-n, including components and databases such as but not limited to sites (e.g., locations, benchmarks, performance service level, etc.), labor (e.g., schedule, shifts, certification, skills, etc.), operations (e.g., plans, equipment, service or maintenance types, etc.), assets (e.g., simulated reality systems, robots, etc.), and workers (e.g., trends, profiles, task performance, etc.). EPM control tower 310a-n and networked warehouse system of record 320a-n can reside in a cloud based computing system 342 (which may be the same component as, or a part of, cloud 130 of FIG. 1) and be communicatively coupled to a data transformation and integration layer 330.

System 342 may be communicatively coupled to edge computing system 344. System 344 can be an edge computing system or node with a dedicated unit onsite at the work site (e.g., maintenance facility, hanger, warehouse, etc.). System 344 can be configured to process data and information from labor database 338, asset control systems 336 (e.g., components related to control of augmented and simulated reality subsystems 110, 120 of FIG. 1, robots, etc.) and worker tasks database 332. Database 338 can include databases for warehouse management services (WMS) and warehouse execution systems (WES).

Database 332 can include one or more telemetry components (e.g. telemetry subsystem 170 of FIG. 1) operatively coupled to features of environment 200 (see FIG. 2) so as to process and transmit control information for consumption by one or more controllers of system 300 over a network. Database 332 can be configured for data validation and modification for incoming telemetry or attributes before saving to the database; copy telemetry or attributes from devices to related assets to aggregate telemetry, e.g., data from multiple subsystems can be aggregated in related asset; create/update/clear alarms based on defined conditions; trigger actions based on edge life-cycle events, e.g., create alerts if device is online/offline; load additional data required for processing, e.g., load threshold value for a device that is defined in a user, device, and/or employee attribute; raise alarms/alerts when complex event occurs and use attributes of other entities inside email template; and/or consider user preferences during event processing. In some aspects, messages transmitted from database 332, such as triggers and/or alerts, can be configured for transmitting information to an end user (e.g., site lead, supervisor tower, etc.) for optimization purposes. System 300 can also be configured to detect near accidents or other misses to build a trend model for early detection of anomalies before faults or malfunctions occur increasing safety. In some aspects, the trend model can perform statistical analysis of worker trends including assigned tasks, event datasets to derive insights on worker performance considering the nature of work, skillset, criticality, labor intensity, etc. In some aspects, the trend model can classify data on a variety of key performance parameters to generate reports, dashboards, and insights that can be presented to users. In some aspects, the trend model can determine benchmarks based on statistics for type of task, skill set, geographical location, etc. to enable performance-based assessment, incentives and target setting for worker operations.

The system 300 described in FIG. 3 may be used to evaluate the performance of workers (e.g. user 112 of FIG. 1) with respect to one or more assigned tasks using a variety of sources including voice input, scanning, device usage, network activity, location-based events, visual recognition events. The input from these sources may be fed to algorithms that identify cases where workers are committing errors, not fully engaged or not making expected progress in their assigned tasks.

The system 300 employs a plurality of methods to track the real-time progress of the tasks. The system interfaces with external systems to track specific task scheduled start times, the progress of the task after it has commenced, and a completion of the task. Each task may be broken down to various stages and each stage associated with desirable time for completion. The time duration of each stage would be based on historic performance of workers, level of skill involved, and/or company or regulatory practices or policies.

Figure 4:
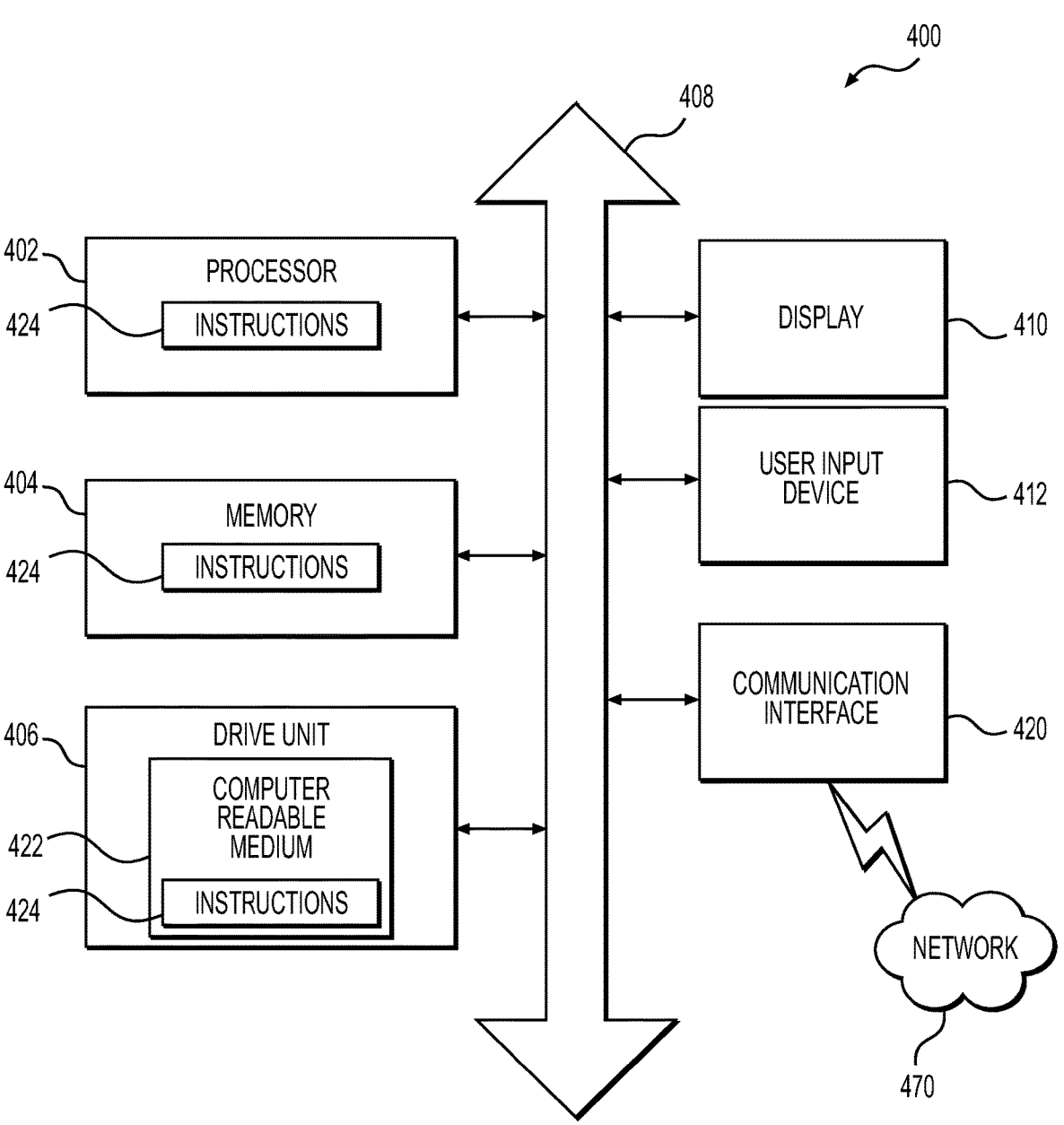
FIG. 4 is an implementation of a computer system that may execute techniques presented herein, according to one or more embodiments.

Various embodiments of the present disclosure (e.g., augmented reality systems/subsystems, simulated reality training systems/subsystems, virtual reality systems/subsystems, edge systems, gateway systems, operations centers, remote systems, warehouse systems, data centers, etc.), as described above with reference to FIGS. 1-3 may be implemented using controller 400 of FIG. 4. FIG. 4 depicts an implementation of controller 400 that may execute techniques presented herein, according to one or more embodiments. Controller 400 may include a set of instructions that can be executed to cause controller 400 to perform any one or more of the methods or computer based functions disclosed herein. Controller 400 may operate as a standalone device or may be connected, e.g., using a network, to other computer systems or peripheral devices.

In a networked deployment, controller 400 may operate in the capacity of a server or as a client in a server-client user network environment, or as a peer computer system in a peer-to-peer (or distributed) network environment. Controller 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a headset, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, controller 400 can be implemented using electronic devices that provide audio, video, or data communication. Further, while controller 400 is illustrated as a single system, the term "system" shall also be taken to include any collection of systems or subsystems that individually or jointly execute a set, or multiple sets, of instructions to perform one or more computer functions. For example, controller 400 may be individually or jointly implemented as or incorporated into any combination of system 100, augmented reality subsystem 110, simulated reality training subsystem 120, cloud 130, and data center 140 of FIG. 1.

As illustrated in FIG. 4, controller 400 may include at least one processor 402, e.g., a central processing unit (CPU), a graphics processing unit (GPU), or both. At least one processor 402 may be a component in a variety of systems. For example, at least one processor 402 may be part of a standard computer. At least one processor 402 may be one or more general processors, digital signal processors, application specific integrated circuits, field programmable gate arrays, servers, networks, digital circuits, analog circuits, combinations thereof, or other now known or later developed devices for analyzing and processing data. At least one processor 402 may implement a software program, such as code generated manually (i.e., programmed).

Controller 400 may include memory 404 that can communicate via a bus 408. Memory 404 may be a main memory, a static memory, or a dynamic memory. Memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, memory 404 includes a cache or random-access memory for at least one processor 402. In alternative implementations, memory 404 is separate from at least one processor 402, such as a cache memory of a processor, the system memory, or other memory. Memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. Memory 404 is operable to store instructions executable by at least one processor 402. The functions, acts or tasks illustrated in the figures or described herein may be performed by at least one processor 402 executing the instructions stored in memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, controller 400 may further include display 410, such as a liquid crystal display (LCD), an organic light emitting diode (OLED), a flat panel display, a solid-state display, a cathode ray tube (CRT), a projector, a printer or other now known or later developed display device for outputting determined information. The display 410 may act as an interface for the user to see the functioning of at least one processor 402, or specifically as an interface with the software stored in memory 404 or in the drive unit 406.

Additionally or alternatively, controller 400 may include input device 412 configured to allow a user to interact with any of the components of controller 400. Input device 412 may be a number pad, a keyboard, or a cursor control device, such as a mouse, or a joystick, touch screen display, remote control, headset, or any other device operative to interact with controller 400.

Controller 400 may also or alternatively include drive unit 406 implemented as a disk or optical drive. Drive unit 406 may include a computer-readable medium 422 in which one or more sets of instructions 424, e.g. software, can be embedded. Further, the instructions 424 may embody one or more of the methods or logic as described herein. The instructions 424 may reside completely or partially within memory 404 and/or within at least one processor 402 during execution by controller 400. Memory 404 and at least one processor 402 also may include computer-readable media as discussed above.

In some systems, computer-readable medium 422 includes instructions 424 or receives and executes instructions 424 responsive to a propagated signal so that a device connected to network 470 can communicate voice, video, audio, images, or any other data over network 470. Further, the instructions 424 may be transmitted or received over network 470 via communication port or interface 420, and/or using bus 408. Communication port or interface 420 may be a part of at least one processor 402 or may be a separate component. Communication port or interface 420 may be created in software or may be a physical connection in hardware. Communication port or interface 420 may be configured to connect with network 470, external media, display 410, or any other components in controller 400, or combinations thereof. The connection with network 470 may be a physical connection, such as a wired Ethernet connection or may be established wirelessly as discussed below. Likewise, the additional connections with other components of controller 400 may be physical connections or may be established wirelessly. Network 470 may alternatively be directly connected to bus 408.

While computer-readable medium 422 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. Computer-readable medium 422 may be non-transitory, and may be tangible.

Computer-readable medium 422 can include a solid-state memory such as a memory card or other package that houses one or more non-volatile read-only memories. Computer-readable medium 422 can be a random-access memory or other volatile re-writable memory. Additionally or alternatively, computer-readable medium 422 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Controller 400 may be connected to network 470. Network 470 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. Network 470 may include wide area networks (WAN), such as the Internet, local area networks (LAN), campus area networks, metropolitan area networks, a direct connection such as through a Universal Serial Bus (USB) port, or any other networks that may allow for data communication. The network 470 may be configured to couple one computing device to another computing device to enable communication of data between the devices. Network 470 may generally be enabled to employ any form of machine-readable media for communicating information from one device to another. Network 470 may include communication methods by which information may travel between computing devices. Network 470 may be divided into sub-networks. The sub-networks may allow access to all of the other components connected thereto or the sub-networks may restrict access between the components. Network 470 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Referring now to FIG. 5, illustrated is a flow diagram of method 500 for integrating a simulated reality training environment and an augmented reality environment, in accordance with an embodiment of the present disclosure. The simulated reality training environment referred to in the description of FIG. 5 may be generated, for example, by simulated reality training subsystem 120 of FIG. 1. In some embodiments, the simulated reality training environment may be a virtual reality training environment. The augmented reality environment referred to in the description of FIG. 5 may be generated, for example, by augmented reality subsystem 110 of FIG. 1. Each of steps 510-550 of method 500 may be performed automatically be at least one processor, such as included in controller 400, associated with augmented reality subsystem 110, simulated reality training subsystem 120, cloud 130, data center 140, and/or master device 150 of FIG. 1. In some embodiments, each of steps 510-550 are performed by controller 400 associated with augmented reality subsystem 110 (e.g. a controller of one or more wearable or handheld devices 114). In some embodiments, each of steps 510-550 are performed by controller 400 associated with data center 140. In some embodiments, steps 510-550 are performed by a plurality of connected controllers. For example, some of steps 510-550 are performed by a controller associated with data center 140, and others of steps 510-550 are performed by a controller associated with augmented reality subsystem 110.

With continued reference to FIG. 5, at step 510, method 500 includes receiving simulated reality training feedback associated with performance of a simulated task in the simulated reality training environment. The simulated task may include, for example, a maintenance or service operation performed by user 122 on a virtual model of a piece of equipment (such as an aircraft). The simulated reality training feedback may include data specific to user 122, for example, the time user 122 spent performing individual portions of the simulated task, the time user 122 spent performing the simulated task in its entirety, errors that user 122 made while performing the simulated task, and/or other information that is beneficial to analyzing performance of user 122. Simulated reality training feedback may further include data aggregated from performance of the simulated task across a plurality of users, for example, statistical data (e.g. mean, median, and mode) relating to the time users spent performing individual portions of the simulated task, statistical data (e.g. mean, median, and mode) relating to the time users spent performing the simulated task in its entirety, accounting of different errors made by users while performing the simulated task, rates of occurrence of different errors made by users while performing the simulated task, error type data (i.e. particular types of errors made by users); and/or other information that is beneficial to analyzing performance of the simulated task across the plurality of users. Simulated reality training feedback may be stored in a database, such as IFS servers 144 of data center 140. Simulated reality training feedback may be continuously updated each time a user performs the simulated task in the simulated reality training environment.

Referring still to FIG. 5, at step 520, method 500 includes determining a source of error in the performance of the simulated task in the simulated reality training environment based on the simulated reality training feedback. The source of error may be determined based on specific performance of user 122 in the simulated reality training environment, and/or aggregate performance of a plurality of users in the simulated reality training environment. In some embodiments, the source of error may be determined based on one or more particular errors committed by user 122 in the simulated reality training environment so that user 112 (who may be the same entity as user 122 in some embodiments) in the augmented reality environment is prompted to avoid the same error. In some embodiments, the source of error may be determined based on averages or trends of a plurality of users in the simulated reality training environment, so that user 112 is prompted to avoid common errors. In some embodiments, the source of error may also be determined at least partially based on a degree of detriment should an error be committed by user 112. For example, major errors which are not easily correctable and/or pose significant risks of safety, damage, and/or cost may be included in the source of error, while minor errors which are easily corrected and/or pose relatively low associated risks may be intentionally disregarded.

In various embodiments, the source of error may include, for example, that user 122 omitted a step during performance of the simulated task, that user 122 performed a step of the simulated task in an incorrect order, that user 122 performed a step of the simulated task improperly, that user 122 manipulated an incorrect component of the virtual model, that user 122 was unable to identify a necessary component of the virtual model, that user 112 introduced an incorrect step that was not part of a task, that user 112 did no complete all steps of the task, that user 112 incorrectly marked a task as completed, that user 112 failed to complete a step in a correct time (either too slow or too fast), that user 112 chose an incorrect task to complete from a list of available tasks, and/or that user 112 is about to perform a high risk step (in terms of safety and/or potential component damage).

Referring still to FIG. 5, at step 530, method 500 includes determining a preventative action for preventing occurrence of the source of error during a real-world task to be performed in the augmented reality environment by user 112. The preventative action may be tailored specifically to the source of error determined at step 520. For example, if the source of error determined at step 520 is that user 122 omitted a step during performance of the simulated task, the preventative action may include advising user 112 to ensure that the omitted step is performed. Alternatively or additionally, the preventative action may include advising user 112 to slow down. As another example, if the source of error determined at step 520 is that user 122 performed a step of the simulated task in an incorrect order, the preventative action may include advising user 112 of the proper time to perform that step. As another example, if the source of error determined at step 520 is that user 122 user performed a step of the simulated task improperly, the preventative action may include providing user 112 detailed guidance through performance of that step. Alternatively or additionally, the preventative action may include connecting user 112 to a remote person (e.g. an instructor) to provide guidance to user 112. As another example, if the source of error determined at step 520 is that user 122 manipulated an incorrect component of the virtual model, the preventative action may include highlighting the correct real-world component in the augmented reality environment. As another example, if the source of error determined at step 520 is that user 122 was unable to identify a necessary component of the virtual model, the preventative action may include highlighting the necessary real-world component in the augmented reality environment. As another example, if the source of error determined at step 520 is that user 122 introduced an incorrect step that was not part of a task, the preventative action may include advising user 112 to stop and/or undo the incorrect step. As another example, if the source of error determined at step 520 is that user 112 did not complete all steps of the task, the preventative action may include advising user 112 of the omitted step(s). As another example, if the source of error determined at step 520 is that user 112 incorrectly marked a task as completed, the preventative action may include advising user 112 of outstanding task requirements. As another example, if the source of error determined at step 520 is that user 112 failed to complete a step in a correct time (either too slow or too fast), the preventative action may include advising user 112 of the allotted time for that step. As another example, if the source of error determined at step 520 is that user 112 chose an incorrect task to complete from a list of available tasks, the preventative action may include advising user 112 of the correct task. As another example, if the source of error determined at step 520 is that user is about to perform a high risk step, the preventative action may include requiring authorization to proceed.

Referring still to FIG. 5, at step 540, method 500 includes generating virtual content, based on the preventative action determined at step 530, to assist user 112 in avoiding the source of error during performance of the real-world task in the augmented reality environment. The virtual content may include, for example, visual, audio, or other sensory content that can be seen, heard, or otherwise experienced by user 112 in the augmented reality environment. The virtual content may include, for example, a dashboard, a checklist, instructions, a picture, a video, a page from a manual, a wiring diagram, an exploded view of a component assembly, a list of required tools, a list of required consumables (e.g., oil, grease, etc.), a list of required protective equipment (e.g., safety glasses, gloves, hazmat suit, etc.), a timer and/or a caution/warning message displayed in the field of vision of user 112. The virtual content may alternatively or additionally include images overlaid onto real-world objects in the augmented reality environment. The virtual content may alternatively or additionally include an audio message, narration, sounds (e.g. audio samples of normal running sounds, audio samples of sounds during a component failure, audio indicators of an impending failure), and/or audio connection to a remote person. Virtual content may alternatively or additionally include an interface through which user 112 can request and receive authorization from a supervisor or reviewer to proceed with a task. Such authorization may be required, for example, prior to user 112 performing a step of the task that could result in injury or damage to expensive equipment.

In some instances, the virtual content is directly related to a preventative action determined at step 530. For example, if the preventative action determined at step 530 includes advising user 112 to ensure that a step of a task is performed, the virtual content may include a visual and/or audio message advising the user to perform that step at the correct time. As another example, if the preventative action determined at step 530 includes advising user 112 to slow down, the virtual content may include a visual and/or audible timer. As another example, if the preventative action determined at step 530 includes advising user 112 of the proper time to perform a step, the virtual content may include a visual or audio message advising user 112 to perform that step at the correct time. As another example, if the preventative action determined at step 530 includes providing detailed guidance through performance of a step, the virtual content may include visual instructions and/or audio narration of the proper procedure for that step. As another example, if the preventative action determined at step 530 includes connecting user 112 to a remote person, the virtual content may include an audio feed to the remote person. As another example, if the preventative action determined at step 530 includes highlighting a real-world component in the augmented reality environment, the virtual content may include an image to be overlaid on that component. As another example, if the preventative action determined at step 530 includes advising user 112 to stop and/or undo the incorrect step, the virtual content may include a visual or audio message advising user 112 to stop and/or undo the incorrect step. As another example, if preventative action determined at step 530 includes advising user 112 of the omitted step(s), the virtual content may include a visual or audio message advising user 112 to perform the omitted step(s). As another example, if the preventative action determined at step 530 includes advising user 112 of outstanding task requirements, the virtual content may include a visual or audio message advising user 112 to perform the omitted step. As another example, if the preventative action determined at step 530 includes advising user 112 of the allotted time for that step, the virtual content may include a visual and/or audio timer. As another example, if the preventative action determined at step 530 includes advising user 112 of the correct task, the virtual content may include a visual or audio message advising user 112 to perform the correct task. As another example, if the preventative action determined at step 530 includes requiring authorization to proceed, the virtual content may include a visual or audio interface for requesting and receiving approval from a supervisor.

FIG. 6 depicts table 600 showing correspondence between the source of error determined at step 520, the preventative action determined at step 530, and the virtual content generated at step 540. It is to be understood that table 600 and this Detailed Description merely provide non-limiting examples of the present disclosure, and those skilled in the art would recognize that additional sources or error, preventative actions, and virtual content are within the scope and spirit of the present disclosure. The virtual content may, for example, include any type content that can be produced by augmented reality subsystem 110 of FIG. 1.

Referring again to FIG. 5, at step 550, method 500 includes causing the virtual content to be displayed to user 112 in the augmented reality environment during performance of the real-world task. In this context, "display" means presenting the virtual content in any manner that can be experienced by user 112, including visual display of images, emission of sound, and/or applicable presentation of any other sensory content. The virtual content may be displayed by one or more wearable or handheld devices 114 (see FIG. 1). Where the virtual content is visual content, one or more wearable or handheld devices 114 may project the virtual content into the field of view of user 112. Where the virtual content is audio content, the one or more wearable or handheld devices 114 may emit the virtual content, for example via an earpiece. By displaying the virtual content to user 112 in the augmented reality environment, user 112 is prompted to perform the preventive action determined at step 530, or to otherwise optimize performance of the real-world task. In some embodiments, such as when step 550 is performed by controller 400 associated with data center 140, data center 140 causes the one or more wearable or handheld devices 114 to display the virtual content by sending instructions over a network to augmented reality subsystem 110.

Referring now to FIG. 7, illustrated is a flow diagram of method 700 for integrating a simulated reality training environment and an augmented reality environment, in accordance with an embodiment of the present disclosure. The simulated reality training environment referred to in the description of FIG. 7 may be generated by simulated reality training subsystem 120 of FIG. 1. In some embodiments, simulated reality training environment may be a virtual reality training environment. The augmented reality environment referred to in the description of FIG. 7 may be generated by augmented reality subsystem 110 of FIG. 1. Each of steps 710-770 of method 700 be performed automatically be at least one processor, such as included in controller 400, associated with augmented reality subsystem 110, simulated reality training subsystem 120, cloud 130, data center 140, and/or master device 150 of FIG. 1. In some embodiments, each of steps 710-750 are performed by controller 400 associated with augmented reality subsystem 110 (e.g. a controller of one or more wearable or handheld devices 114). In some embodiments, each of steps 710-750 are performed by controller 400 associated with data center 140. In some embodiments, steps 710-750 are performed by a plurality of connected controllers. For example, some of steps 710-750 are performed by a controller associated with data center 140, others of steps 710-750 are performed by a controller associated with augmented reality subsystem 110, and still others of steps 710-750 are performed by a controller associated with simulated reality training subsystem 120.

With continued reference to FIG. 7, at step 710, method 700 includes receiving simulated reality training feedback associated with performance of a simulated task in the simulated reality training environment. At step 720, method 700 includes determining a source of error in the performance of the simulated task in the simulated reality training environment based on the simulated reality training feedback. At step 730, method 700 includes determining a preventative action preventing occurrence of the source of error during a real-world task to be performed in the augmented reality environment. At step 740, method 700 includes generating virtual content, based on the preventative action, to assist user 112 in avoiding the source of error during performance of the real-world task in the augmented reality environment. At step 750, method 700 includes causing the virtual content to be displayed to user 112 in the augmented reality environment during performance of the real-world task. Steps 710, 720, 730, 740, and 750 of method 700 may be substantially identical to steps 510, 520, 530, 540, and 550, respectively, of method 500 of FIG. 5.

Referring still FIG. 7, at step 760, method 700 includes gathering augmented reality feedback from the augmented reality environment. Augmented reality feedback may include data unique to user 112, and/or data representative of a plurality of users (of which user 112 may be one). Augmented reality feedback may include, for example, occurrences of errors made by user 112 and/or observation of behaviors made by user 112 during performance of one or more real-world tasks in the augmented reality environment. Particular behaviors of interest may include for example, requests for additional help, going back a step during performance of a task, starting over a step of a task, using additional parts, and other behaviors indicating that user 112 is not entirely comfortable or proficient at performing a task. Observation of such behaviors may be used as a proxy for error detection (or preemptively preventing errors) particularly where the system is not able to directly detect user errors in the real world.

Augmented reality feedback may further include object recognition carried out by artificial intelligence and/or machine learning models, and tracking of user motion and or manipulation of objects in the real-world environment by artificial intelligence and/or machine learning models. Augmented reality feedback may further include completion times of one or more real-world tasks performed by user 112 in the augmented reality environment; assessment of the competency of user 112 with respect to one or more real-world tasks performed by user 112 in the augmented reality environment; and the like.

Augmented reality feedback may further include averages of data relating to performance of user 112 over multiple instances of performing one or more real-world tasks in the augmented reality environment, such as error rate during performance of one or more real-world tasks, average completion time of one or more real-world tasks, and the like. Augmented reality feedback may further include aggregated data for a plurality of users, of which user 112 may be one. Such aggregated data may include, for example: error rates of users during performance of one or more real-world tasks in the augmented reality environment; statistical data (e.g., mean, median, and mode) of completion times of one or more tasks performed by users in the augmented reality environment; and the like.

Augmented reality feedback may further include manual input from user 112 (or a plurality of users) of augmented reality subsystem 110. For example, user 112 may be prompted during and/or upon completion of a task in augmented reality environment to provide suggestions for improving correlation between simulated reality training environment and the real world. For example, user 112 may flag instances where the task in the real world did not match the task in simulated reality training environment; where replacement parts were not built properly (e.g., bolt holes do not align, etc.); where local weather conditions required deviation from the task as performed in simulated reality training environment (e.g., cold weather requires thicker gloves, but thicker gloves interfere with the tools specified in simulated reality training environment; an air compressor was inoperable due to freezing conditions; a metal part exposed to sun became too hot to handle without protective gloves; etc.).

Augmented reality feedback may be stored in a database, such as IFS servers 144 of data center 140. Augmented reality feedback may be continuously updated each time a user performs a real-world task in the augmented reality environment.

Referring still FIG. 7, at step 770, method 700 includes updating the simulated reality training environment based on the augmented reality feedback. This improves the effectiveness of the simulated reality training environment for future users because the updated simulated reality training environment more accurately reflects the experience of users performing real-world tasks in the augmented reality environment. For example, if the augmented reality feedback indicates that user(s) consistently make an error in the augmented reality environment, the virtual reality training environment can be updated to better train future users to avoid such errors. Moreover, the virtual reality training environment can be updated based on the user-input suggestions for improving correlation between the simulated reality training environment and the real world. Updating the simulated reality training environment may include, for example, updating virtual model(s) in the simulated reality training environment to more accurately reflect real-world components and conditions, and/or increasing the difficulty of simulated tasks in the simulated reality training environment to improve user competency. Updating the simulated reality training environment may be performed, for example, by IFS servers 144 of data center 140.

As can be readily appreciated from the foregoing description, the present disclosure provides for improving an augmented reality environment based on feedback from a simulated reality training environment, and for improving the simulated reality training environment based on feedback from an augmented reality environment. Thus, by integrating augmented reality subsystem 110 and the simulated reality training subsystem 120 (as shown in FIG. 1) in accordance with embodiments of the present disclosure, both subsystems 110, 120 and overall system 100 are improved beyond how subsystems 110, 120 and system 100 could be improved individually.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for integrating a simulated reality training environment and an augmented reality environment, the method comprising:
   receiving, by at least one processor, simulated reality training feedback associated with performance of a simulated task in the simulated reality training environment;
   determining, by at least one processor, a source of error in the performance of the simulated task in the simulated reality training environment based on the simulated reality training feedback;

determining, by at least one processor, a preventative action for preventing occurrence of the source of error during a real-world task to be performed in the augmented reality environment;
generating, by at least one processor, virtual content based on the preventative action to assist a user in avoiding the source of error during the real-world task to be performed in the augmented reality environment; and
causing, by at least one processor, the virtual content to be displayed to the user in the augmented reality environment during performance of the real-world task.

2. The method of claim 1, wherein the simulated reality training feedback comprises at least one of:
   a time spent performing individual portions of the simulated task;
   a time spent performing the simulated task in its entirety; and
   one or more errors made while performing the simulated task.

3. The method of claim 1, wherein the virtual content comprises at least one of:
   a message;
   a timer;
   instructions for performing a step;
   an audio feed to a remote person; and
   an image to be overlaid on a real-world component.

4. The method of claim 1, further comprising:
   gathering, by at least one processor, augmented reality feedback from the augmented reality environment; and
   updating, by at least one processor, the simulated reality training environment based on the augmented reality feedback.

5. The method of claim 4, wherein the augmented reality feedback comprises at least one of:
   a time spent performing individual portions of the real-world task;
   a time spent performing the real-world task in its entirety; and
   one or more errors made while performing the real-world task.

6. The method of claim 1, wherein the augmented reality environment is generated by one or more wearable or handheld devices.

7. The method of claim 1, wherein the simulated reality training environment is a virtual reality environment.

8. A computer system for integrating a simulated reality training environment and an augmented reality environment, the computer system comprising:
   a memory having processor-readable instructions stored therein; and
   one or more processors configured to access the memory and execute the processor-readable instructions, which when executed by the one or more processors configures the one or more processors to perform a plurality of functions, including functions for:
      receiving, by at least one processor, simulated reality training feedback associated with performance of a simulated task in the simulated reality training environment;
      determining, by at least one processor, a source of error in the performance of the simulated task in the simulated reality training environment based on the simulated reality training feedback;
      determining, by at least one processor, a preventative action for preventing occurrence of the source of error during a real-world task to be performed in the augmented reality environment;

generating, by at least one processor, virtual content based on the preventative action to assist a user in avoiding the source of error during the real-world task to be performed in the augmented reality environment; and causing, by at least one processor, the virtual content to be displayed to the user in the augmented reality environment during performance of the real-world task.

9. The system of claim 8, wherein the simulated reality training feedback comprises at least one of:

a time spent performing individual portions of the simulated task;

a time spent performing the simulated task in its entirety; and one or more errors made while performing the simulated task.

10. The system of claim 8, wherein the virtual content comprises at least one of:

a message;

a timer;

instructions for performing a step;

an audio feed to a remote person; and an image to be overlaid on a real-world component.

11. The system of claim 8, wherein the plurality of functions further includes functions for:

gathering, by at least one processor, augmented reality feedback from the augmented reality environment; and updating, by at least one processor, the simulated reality training environment based on the augmented reality feedback.

12. The system of claim 11, wherein the augmented reality feedback comprises at least one of:

a time spent performing individual portions of the real-world task;

a time spent performing the real-world task in its entirety; and one or more errors made while performing the real-world task.

13. The system of claim 8, wherein the augmented reality environment is generated by one or more wearable or handheld devices.

14. The system of claim 8, wherein the simulated reality training environment is a virtual reality environment.

15. A non-transitory computer-readable medium containing instructions for integrating a simulated reality training environment and an augmented reality environment, the instructions comprising:

receiving, by at least one processor, simulated reality training feedback associated with performance of a simulated task in the simulated reality training environment;

determining, by at least one processor, a source of error in the performance of the simulated task in the simulated reality training environment based on the simulated reality training feedback;

determining, by at least one processor, a preventative action for preventing occurrence of the source of error during a real-world task to be performed in the augmented reality environment;

generating, by at least one processor, virtual content based on the preventative action to assist a user in avoiding the source of error during the real-world task to be performed in the augmented reality environment; and causing, by at least one processor, the virtual content to be displayed to the user in the augmented reality environment during performance of the real-world task.

16. The non-transitory computer-readable medium of claim 15, wherein the simulated reality training feedback comprises at least one of:

a time spent performing individual portions of the simulated task;

a time spent performing the simulated task in its entirety; and one or more errors made while performing the simulated task.

17. The non-transitory computer-readable medium of claim 15, wherein the virtual content comprises at least one of:

a message;

a timer;

instructions for performing a step;

an audio feed to a remote person; and an image to be overlaid on a real-world component.

18. The non-transitory computer-readable medium of claim 15, wherein the instructions further comprise:

gathering, by at least one processor, augmented reality feedback from the augmented reality environment; and updating, by at least one processor, the simulated reality training environment based on the augmented reality feedback.

19. The non-transitory computer-readable medium of claim 18, wherein the augmented reality feedback comprises at least one of:

a time spent performing individual portions of the real-world task;

a time spent performing the real-world task in its entirety; and one or more errors made while performing the real-world task.

20. The non-transitory computer-readable medium of claim 15, wherein the augmented reality environment is generated by one or more wearable or handheld devices.

* * * * *